Jan. 26, 1971   P. FRERICHS   3,557,633
INTERNAL GEAR
Filed March 7, 1969
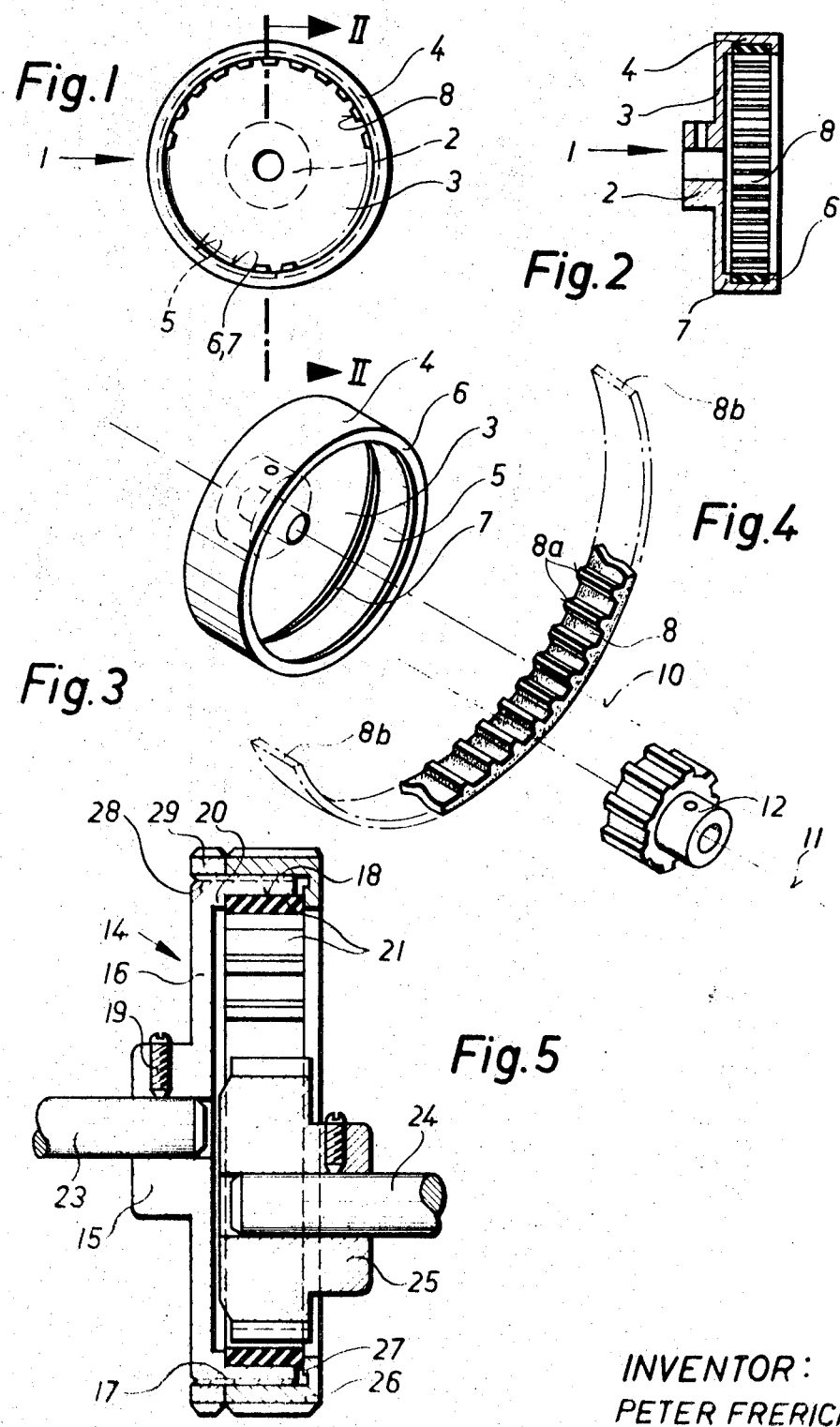
INVENTOR:
PETER FRERICHS
BY [signature]
his ATTORNEY

United States Patent Office 3,557,633
Patented Jan. 26, 1971

3,557,633
INTERNAL GEAR
Peter Frerichs, Wilhelmshaven, Germany, assignor to Olympia Werke AG, Wilhelmshaven, Germany
Filed Mar. 7, 1969, Ser. No. 805,334
Claims priority, application Germany, Mar. 28, 1968, 1,750,089
Int. Cl. B21k 1/30; F16h 55/12, 57/00
U.S. Cl. 74—447                                14 Claims

ABSTRACT OF THE DISCLOSURE

An internal gear wherein a rim which is connected with a shaft surrounds a split annular flexible toothed belt which is bonded to or in mere frictional engagement with the internal surface of the rim. In the latter instance, the internal gear constitutes a friction coupling which ceases to transmit torque when the belt or the rim offers excessive resistance to rotation.

BACKGROUND OF THE INVENTION

The present invention relates to internal gears or annulars in general, and more particularly to improvements in low-cost internal gears.

Internal gears are normally more expensive than spur gears, especially those with a relatively small pitch diameter. This is due to the fact that the teeth of a relatively small internal gear cannot be subjected to a conventional grinding operation. Small internal gears are often produced by punching or stamping. It is also known to produce small internal gears by casting, pressing or by injection molding. However, the cost of tools and plants for the production of such internal gears is often prohibitive, especially if the gears must be produced in small batches.

It is further known to assemble a spur gear of two parts which are connected to each other by threads. For example, the rim often consists of relatively inexpensive vast metallic material and the teeth consist of bronze or an analogous alloy. Such method can be employed for the production of certain types of internal gears; however, the resulting product is more expensive than a conventional internal gear.

SUMMARY OF THE INVENTION

An object of my invention is to provide a simple and versatile internal gear which can be furnished in any desired size and which can be made at a reasonable cost regardless of whether it is produced in large numbers or in small batches.

Another object of the invention is to provide an internal gear which produces little noise, which can be produced and assembled in a small workshop, which utilizes simple and readily available parts and materials and which, in addition to transmitting torque, can also serve other important and useful purposes.

A further object of the invention is to provide an internal gear which is designed in such a way that the operator can determine in advance the maximum torque which the gear can transmit in actual use.

An additional object of the invention is to provide an internal gear which can be used in existing machinery as an inexpensive substitute for presently used internal gears.

Still another object of the invention is to provide an internal gear whose teeth need not be subjected to grinding, shaving, lapping or similar time-consuming treatment.

The improved internal gear comprises a rigid rotary ring-shaped rim which is provided with a radially inwardly extending flange at one axial end and is open at the other axial end, and an annular split belt of natural rubber, synthetic plastic or other suitable flexible material which has an external surface abutting against the internal surface of the rim and radially inwardly extending teeth. The belt can be held in mere frictional engagement with or is permanently secured (for example, bonded) to the rim. It is preferred to install the belt with at least some compression so that the length of the external surface of the belt in uncompressed condition (i.e., upon withdrawal from or prior to insertion into the rim) exceeds the circumferential length of the internal surface of the rim. The belt may be provided with one or more embedded inserts, fillers or analogous means for holding it against excessive expansion or contraction in circumferential direction.

If the belt is in mere frictional engagement with the rim, the internal gear is preferably provided with adjustable biasing means for regulating friction between the belt and the rim. In such internal gears, one end face of the belt bears against the aforementioned flange and the biasing means preferably comprises a nut which meshes with the rim and bears against the other end face of the belt. Rotation and resulting axial movement of the nut brings about stronger or weaker frictional engagement between the abutting surfaces of the belt and rim as well as between the flange and the corresponding end face of the belt.

The novel features which are considered as characteristic of the invention are set forth in particular in the appended claims. The improved internal gear itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an end elevational view of an internal gear which embodies one form of the invention;

FIG. 2 is an axial sectional view of the internal gear as seen in the direction of arrows from the line II—II of FIG. 1;

FIG. 3 is a perspective view of a rim and of a flange both of which constitute component parts of the internal gear shown in FIG. 1;

FIG. 4 is a fragmentary developed perspective view of a flexible belt which constitutes a further component part of the internal gear shown in FIG. 1, and further showing a spur gear which can be placed into mesh with the internal gear; and FIG. 5 is an axial sectional view of a second internal gear, further showing a pinion which meshes with the second internal gear.

DESCRIPTION OF THE PREFERRED EMBODIMENTS

FIGS. 1 and 2 illustrate an internal gear or annular 1 which comprises a ring-shaped rim 4 one axial end of which is integral with a radially inwardly extending annular flange 3 provided with a hub 2. The cylindrical internal surface 5 of the rim 4 abuts against the cylindrical external surface of a flexible toothed belt 8 whose longitudinal end faces abut against a shoulder 7 on the flange 3 and against a shoulder or an internal annular bead 6 provided at the right-hand axial end of the rim 4, as viewed in FIG. 2 or 3. It will be seen that the internal surface 5 is the bottom surface of a ring-shaped groove between the shoulder 7 and bead 6 of the rim 4, and this groove accommodates the belt 8. The latter forms a finite length of a commercially available elastic belt having radially inwardly extending teeth 8a. A portion of the belt 8, as it appears prior to insertion into the groove between the shoulder 7 and bead 6, is shown in FIG. 4. The transverse end faces 8b of the belt 8 are closely adjacent to or actually abut against each other when the belt is converted into an annulus and is properly installed in the rim 4. If desired, the transverse end faces 8b can be glued or otherwise bonded to each other; however, such bonding is optional. As a rule, the length of the belt 8 between its transverse end faces 8b is selected in such a way that it slightly exceeds the circumferential length of the internal surface 5 of the rim 4. Thus, the belt must be inserted in at least slightly compressed condition to thereby insure a certain amount of friction between its external surface and the internal surface of the rim 4. If desired, the internal gear 1 may further comprise means for eliminating or reducing variations in circumferential length of the belt 8 in response to temperature changes. This can be achieved by embedding in the flexible material of the belt one or more inserts of metallic and/or plastic material, for example, one or more lengths of metallic wire or the like.

By proper selection of the internal diameter of the rim 4 and/or external diameter of the belt 8, as well as by properly selecting the finish of the external surface of the belt and/or the finish of the internal surface 5, the manufacturer can readily establish a predetermined friction between the two surfaces. If the belt is not bonded to the rim, the internal gear can be used as a simple friction coupling or overload coupling wherein the rim begins to rotate with reference to the belt 8 when the latter offers a predetermined resistance to rotation with the rim, or vice versa. The numeral 10 denotes in FIG. 3 the axis of a shaft which can be connected with the hub 2 of the flange 3 to rotate the rim 4 and to thereby rotate a pinion 12 (FIG. 4) which meshes with the belt 8. The axis of the pinion 12 is shown at 11. Of course, the pinion 12 can be driven by its shaft to thereby rotate the gear 1. If the internal gear 1 is not intended for use as a friction coupling, the belt 8 can be glued, welded or otherwise permanently secured to the rim 4.

Very satisfactory results were achieved with internal gears whose belts consist of natural or synthetic rubber and with pinions which consist of aluminum. The parts 2, 3 and 4 can be made of metallic or rigid plastic material. Of course, the belt 8 can be made of non-elastic flexible material and the pinion 12 can be made of a rigid plastic or of a metal other than aluminum, depending on the intended use of the internal gear. For example, all of the parts shown in FIGS. 1 to 4 may consist of synthetic plastic material or all such parts, with the possible exception of at least a portion of the belt 8, may consist of metallic material. Since a commercially available toothed belt normally consists of a material which produces little noise, the improved internal gear runs very quietly and is therefore suited for use in typewriters, other types of office and business machines, cameras and/or like apparatus.

FIG. 5 illustrates a second internal gear 14 which constitutes an adjustable friction coupling and which either transmits torque to or receives torque from a pinion 25 mounted on a shaft 24. The hub 15 of the internal gear 14 is separably secured to a shaft 23 by a radical screw 19. The hub 15 is integral with a radial flange 16 which is integral with one axial end of a ring-shaped rim 17 surrounding an annular toothed belt 21. The cylindrical internal surface of the rim 17 is shown at 18; this rim is further provided with external threads, as at 28.

The right-hand end face of the belt 21 extends beyond the adjoining axial end of the internal surface 18 and abuts against the ring-shaped collar 27 of a nut 26 which meshes with the rim 17 and constitutes a means for biasing the left-hand end face of the belt 21 against a ring-shaped shoulder 20 of the flange 16 and for simultaneously biasing the external surface of the belt against the internal surface 18. The operator can rotate the nut 26 with reference to the rim 17 to thereby move the nut and its collar 27 axially and to thus change friction between the end face of the belt 21 and the shoulder 20 as well as between the external surface of the belt and the internal surface 18. Once the nut 26 is properly located in desired axial position, the operator applies a lock nut 29 which also meshes with the rim 17. This lock nut then arrests the biasing nut 26 in selected position.

If desired or necessary, the external surface and/or the end faces of the belt 21 may constitute friction surfaces, i.e., such surface and/or faces may be roughened, milled, grooved or otherwise treated to increase friction with the rim 17, shoulder 20 and/or collar 27.

It is further clear that the right-hand axial end of the rim 17 can extend beyond the right-hand end face of the belt 21 and may be provided with internal threads to take an externally threaded nut replacing the internally threaded nut 26. Such externally threaded nut then bears against the adjoining end face of the belt 21 to determine the amount of friction between the belt and the part 16, 17 and/or 26.

The nut 26 can be moved to such axial position that it normally prevents rotation of the belt 21 with reference to the rim 17 and flange 16, or vice versa. This might be desirable if the device 14 is to be used exclusively as an internal gear. When the gear 14 is used as a friction coupling, the nut 26 can be adjusted with a high degree of precision to make sure that the shaft 23 can rotate with reference to the shaft 24, or vice versa, when the driven shaft offers an accurately determined resistance to rotation with the driving shaft.

An important advantage of my internal gear is that it can be produced at a low cost, even in small numbers. This is due to the fact that the belt 8 or 21 is preferably a commercially available product which can be readily severed to yield sections of desired length. The material of the belt will be selected in dependency on the desired use of the internal gear, on the temperature to which the internal gear is subjected in use, on the desired maximum rotational speed, on the nature and percentage of contaminants in the surrounding area, and/or certain other factors. Belts with teeth of a desired circular pitch are readily available in all sizes and in a variety of qualities. In many instances, a slight or substantial compression of the belt during and/or subsequent to insertion into the coresponding rim suffices to insure satisfactory transmission of torque, i.e., it is normally unnecessary to bond the belt to the rim, even when the improved device is to be used exclusively as an internal gear.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. An internal gear, comprising a rigid rotary rim having a cylindrical internal surface; and a flexible split annular belt provided with radially inwardly extending teeth and having an external surface abutting against said internal surface, the length of said external surface exceeding the circumferential length of said cylindrical inner surface of said rigid rotary rim so that said belt is received in said rim with some compression.

2. An internal gear as defined in claim 1, wherein said belt consists at least in part of elastic material.

3. An internal gear as defined in claim 1, further comprising means for holding said belt against expansion and contraction in circumferential direction thereof.

4. An internal gear as defined in claim 3, wherein said holding means comprises at least one insert embedded in the material of said belt.

5. An internal gear as defined in claim 1, wherein said belt is bonded to said rim.

6. An internal gear as defined in claim 1, wherein said surfaces are slidable with reference to each other in response to a predetermined resistance which said belt offers to rotation with said rim or vice versa so that said gear constitutes a friction coupling.

7. An internal gear as defined in claim 1, wherein the material of said belt is selected from the group consisting of synthetic plastics.

8. An internal gear, comprising a rigid rotary rim having a cylindrical internal surface; a flange rigid with and extending radially inwardly from one axial end of said rim; a flexible split annular belt having an external surface abutting against said internal surface and provided with radially inwardly extending teeth, said belt having two longitudinal end faces and said flange having a face abutting against one end face of said belt; and adjustable biasing means engaging the other end face of said belt and arranged to regulate friction between said belt and said flange as well as between said belt and said rim.

9. An internal gear as defined in claim 8, wherein said biasing means comprises a nut threadedly connected with said rim.

10. An internal gear as defined in claim 9, wherein said rim is provided with external threads and said nut is provided with mating internal threads, said other end face of the belt being axially spaced from the internal surface of said rim.

11. An internal gear as defined in claim 9, further comprising means for locking said nut in selected axial position with reference to said rim.

12. An internal gear as defined in claim 11, wherein said locking means comprises a second nut meshing with said rim.

13. An internal gear as defined in claim 8, wherein the external surface and the end faces of said belt are friction generating surfaces.

14. An internal gear as defined in claim 1, wherein the material of said belt is natural rubber.

References Cited

UNITED STATES PATENTS

| | | | |
|---|---|---|---|
| 2,753,731 | 7/1956 | McWethy | 74—443 |
| 3,175,110 | 3/1965 | Kohlhagen | 74—461X |

LEONARD H. GERIN, Primary Examiner

U.S. Cl. X.R.

29—159.2; 74—411